A. F. ROCKWELL.
COASTING HUB.
APPLICATION FILED AUG. 4, 1903
932,328.
Patented Aug. 24, 1909.
2 SHEETS—SHEET 1.
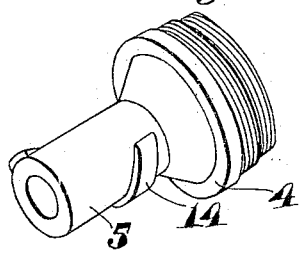
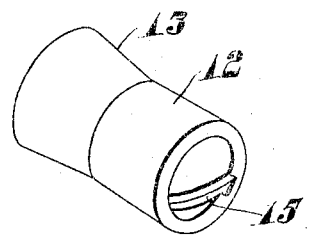
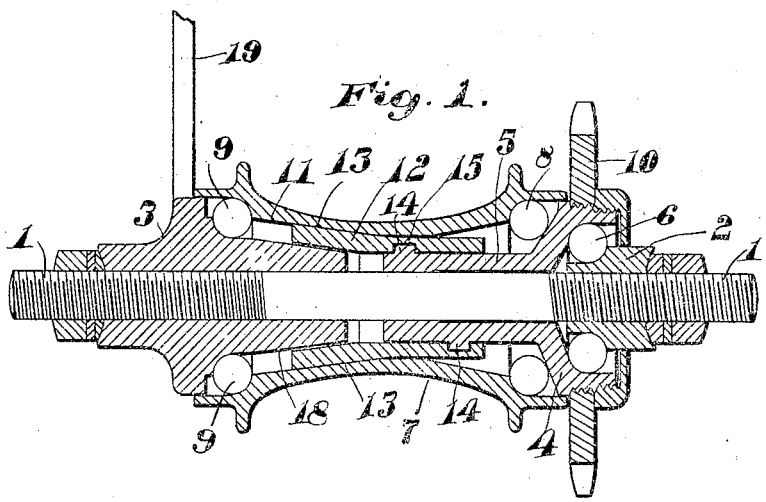

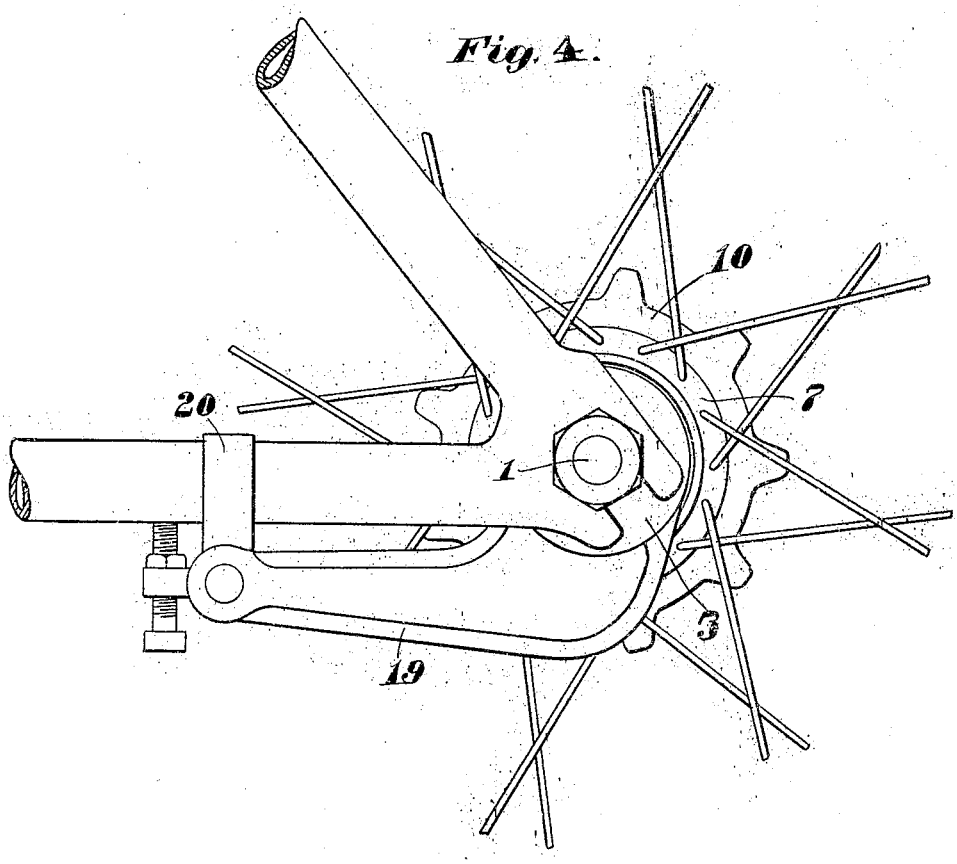

UNITED STATES PATENT OFFICE.

ALBERT F. ROCKWELL, OF BRISTOL, CONNECTICUT, ASSIGNOR TO THE NEW DEPARTURE MANUFACTURING COMPANY, OF BRISTOL, CONNECTICUT, A CORPORATION OF CONNECTICUT.

COASTING-HUB.

932,328.   Specification of Letters Patent.   Patented Aug. 24, 1909.

Application filed August 4, 1903. Serial No. 168,198.

*To all whom it may concern:*

Be it known that I, ALBERT F. ROCKWELL, a citizen of the United States, residing at Bristol, in the county of Hartford and State of Connecticut, have invented certain new and useful Improvements in Coasting-Hubs; and I do hereby declare the following to be a full, clear, and exact description of the invention, such as will enable others skilled in the art to which it appertains to make and use the same.

The present invention relates to bicycles and more particularly to a hub construction which permits the driven wheel to run free or to be clutched to the driver for propulsion.

In riding upon level roads and down inclines, little or no power is required for propelling a bicycle, but if there is a permanent connection between the driven wheel and the pedals, it is necessary for the legs and feet of the rider to remain in motion unless the feet are removed from the pedals. It is very inconvenient to permit the feet to move with the pedals when no power is required, and it is often very difficult and even dangerous for the rider to regain the pedals after he has released them. Furthermore, the removing and replacing of the feet requires some attention. For these and other reasons there is sometimes provided a clutch arrangement whereby the pedals may be clutched to the rear wheel when power is to be applied or unclutched for the purpose of permitting the pedals to remain stationary during coasting.

The object of the present invention is to provide a coasting hub with means for connecting the pedals through the driving and coasting clutch with a fixed support when said pedals are disconnected from the hub, whereby to prevent back pedaling and produce a firm support for the feet of the rider while coasting.

To the above ends the present invention consists in the devices and combinations of devices to be hereinafter described and particularly pointed out in the claims.

The present invention is illustrated in the accompanying drawings in which:—

Figure 1 is a longitudinal section taken through the center of a hub, showing all the operative parts assembled and the axle in position; Fig. 2 is a perspective view of the driver sleeve; Fig. 3 is a perspective view of the clutch sleeve; Fig. 4 shows a side elevation.

Similar reference characters will be used to denote corresponding parts throughout the specification and drawing.

The axle 1 is of the usual type, and is provided with cones 2 and 3, screw threaded upon its ends. A driver 4, having a sleeve 5, is mounted at one end of the axle upon balls 6 bearing upon the cone 2. The hub 7 is supported to turn upon balls 8 and 9 engaging respectively bearings on the driver 4 and on the cone 3. The relation of the hub and driver is such that the sleeve 5 extends into the hub, and the sprocket 10, carried by the driver, is adjacent the end of the hub. The interior of the hub, at the end opposite the driver is made flaring as at 11, the diameter of the bore increasing from the center of the hub toward the end, forming thereby a clutch surface. A clutch sleeve 12, having a flaring portion 13, complementary to the portion 11 of the hub, is supported upon the inner end of the driver sleeve 5.

The clutch sleeve and driver are connected together by means of a spiral rib or thread 14 upon the exterior of the driver sleeve and a complementary internal spiral groove 15 within the clutch sleeve 12. Upon turning the sprocket in a forward direction, the clutch sleeve 12 is drawn into engagement with the interior of the hub, clutching the sprocket and hub together. Upon turning the sprocket in the opposite direction, or holding the sprocket stationary while the hub rotates in a forward direction, the clutch sleeve is moved out of engagement with the hub, leaving the hub free to rotate independently of the sprocket and pedals.

There is provided a fixed support for the pedals when the driving and coasting clutch is disconnected from the hub, which as shown in the drawing is accomplished by providing the cone 3 with a tapering projection 18 projected into and arranged to be engaged by the clutch sleeve 12 when said sleeve is moved to release the hub, whereby the pedals through the driver and clutch sleeve become locked to the cone 3 and thus are prevented from turning farther backward affording a firm rest for the feet of the rider. The cone is provided with the arm 19 projected forward beneath the frame of the bicycle and held there by the strap 20 in the manner employed in coaster brakes.

It is thought that the operation of the mechanism has been sufficiently described in connection with the foregoing description of the mechanism itself and that further description thereof is unnecessary.

Having described my invention I claim as new and desire to protect by Letters Patent of the United States:

1. In combination, a hub having a clutch face, a fixed support provided with a clutch face, a sleeve provided with clutch faces for alternately engaging the clutch face on the hub and the clutch face on the fixed support, a driver, and a connection between the driver and sleeve for operating the sleeve.

2. In combination, a hub having a clutch face, a fixed support provided with a clutch face, an anchoring arm for said fixed support, and a driving sleeve provided with clutch faces for alternately engaging with the clutch face on the hub and the clutch face on the fixed support.

3. In combination, a hub having a clutch face, a fixed support provided with a clutch face, a laterally movable sleeve provided with complementary clutch faces for engaging the clutch face on the hub and the clutch face on the fixed support, a driver, and a connection between the driver and laterally movable sleeve for moving said sleeve laterally.

4. In combination, a hub having a clutch face, a fixed support provided with a clutch face, a laterally movable member provided with a complementary clutch face for engaging the clutch face on the hub and the clutch face on the fixed support, a driver, and a connection between the driver and the laterally movable member whereby a movement of the driver in one direction will cause the laterally movable member to engage the hub to drive it and a movement of the driver in another direction will cause the laterally movable member to rigidly connect the driver and the fixed support.

5. The combination with a driven member, of a driving member, a fixed support immovable relative to the driving and driven members, and laterally movable means for connecting the driving member with the driven member or with the fixed support.

In testimony whereof I affix my signature, in presence of two witnesses.

ALBERT F. ROCKWELL.

Witnesses:
MARY MONAGHAN,
RUSSELL B. PUTNAM.